(12) United States Patent
Yabusaki (10) Patent No.: US 11,659,107 B2
(45) Date of Patent: May 23, 2023

(54) INFORMATION PROCESSING DEVICE AND NON-TRANSITORY COMPUTER READABLE MEDIUM

(71) Applicant: FUJIFILM Business Innovation Corp., Tokyo (JP)

(72) Inventor: Ryoto Yabusaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 184 days.

(21) Appl. No.: 16/984,129

(22) Filed: Aug. 3, 2020

(65) Prior Publication Data

US 2021/0281690 A1 Sep. 9, 2021

(30) Foreign Application Priority Data

Mar. 6, 2020 (JP) .............................. JP2020-039348

(51) Int. Cl.
  *G10L 15/22* (2006.01)
  *H04N 1/00* (2006.01)
  *G10L 25/84* (2013.01)

(52) U.S. Cl.
  CPC ......... *H04N 1/00403* (2013.01); *G10L 15/22* (2013.01); *G10L 25/84* (2013.01); *H04N 1/00952* (2013.01); *G10L 2015/223* (2013.01)

(58) Field of Classification Search
  CPC ........................... H04N 1/00403; G10L 15/22
  See application file for complete search history.

(56) References Cited

U.S. PATENT DOCUMENTS

| | | | |
|---|---|---|---|
| 2014/0078534 A1* | 3/2014 | Oda | G06F 3/1219 358/1.15 |
| 2018/0322870 A1* | 11/2018 | Lee | H04N 21/4394 |
| 2018/0352193 A1* | 12/2018 | Sakai | H04S 7/303 |
| 2019/0115020 A1* | 4/2019 | Matsumoto | G06F 16/00 |
| 2019/0156824 A1 | 5/2019 | Maeda et al. | |

FOREIGN PATENT DOCUMENTS

| | | |
|---|---|---|
| JP | 2008250236 | 10/2008 |
| JP | 2019095835 | 6/2019 |

* cited by examiner

*Primary Examiner* — Ibrahim Siddo
(74) *Attorney, Agent, or Firm* — JCIPRNET (57) ABSTRACT

An information processing device includes a processor configured to receive, as an utterance, an instruction for executing a service, detect a physical operation for executing the service on a device, and cause the device where the operation is detected closest to a time of receiving the instruction to execute the received service.

17 Claims, 11 Drawing Sheets

| SERVICE | DATE AND TIME |
|---|---|
| IMAGE READING | 11/16/2019 15:00:10 |
| IMAGE PRINTING | 11/16/2019 15:10:00 |
| ⋮ | ⋮ |

FIG. 5

| DEVICE ID | PHYSICAL OPERATION | DATE AND TIME |
|---|---|---|
| A | (DOCUMENT PLACED IN ADF) | 11/16/2019 15:00:00 |
| | (CONNECTED TO FAX LINE) | 11/16/2019 12:10:00 |
| | ⋮ | ⋮ |
| B | (DOCUMENT PLACED IN ADF) | 11/16/2019 14:30:30 |
| | (USB MEMORY INSERTED) | 11/16/2019 12:00:00 |
| | ⋮ | ⋮ |
| ⋮ | ⋮ | ⋮ |

FIG. 6

| SERVICE | PHYSICAL OPERATION |
|---|---|
| IMAGE READING | DOCUMENT PLACED IN ADF |
| IMAGE TRANSMISSION | CONNECTED TO FAX LINE |
| ⋮ | ⋮ |

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-039348 filed Mar. 6, 2020.

BACKGROUND

(i) Technical Field

The present disclosure relates to an information processing device and a non-transitory computer readable medium.

(ii) Related Art

Japanese Unexamined Patent Application Publication No. 2008-250236 discloses a speech recognition device provided with a profile creating means that acquires information related to a state in which a driver is in a conversation with a passenger and creates profile data from the acquired information, an utterance target determining means that compares the state of the driver during an utterance by the driver to the profile data and determines whether the utterance is conversation by the driver with a passenger or speech operation input, and a speech recognizing means that performs speech recognition on the utterance determined to be speech operation input by the speech target determining means.

Japanese Unexamined Patent Application Publication No. 2019-095835 discloses a speech control system capable of controlling an output device according to a speech instruction. The speech control system is provided with a first speech control device that receives a speech instruction, a second speech control device that receives a speech instruction, a controlling means that causes the output device to output on the basis of a speech instruction received by at least one of the first speech control device and the second speech control device, and a determining means that determines whether or not a first speech instruction received by the first speech control device and a second speech instruction received by the second speech control device are overlapping speech instructions. In a case where the determining means determines that the first speech instruction and the second speech instruction are overlapping speech instructions, the controlling means limits the output by the output device.

SUMMARY

In the related art, there is an issue in which, in the case where multiple devices exist, a service executed in response to a spoken instruction may be executed by a device not intended by the speaker of the spoken instruction.

Aspects of non-limiting embodiments of the present disclosure relate to avoiding a situation in which multiple devices exist and a service executed in response to a spoken instruction is executed by a device not intended by the speaker of the spoken instruction.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a processor configured to receive, as an utterance, an instruction for executing a service, detect a physical operation for executing the service on a device, and cause the device where the operation is detected closest to a time of receiving the instruction to execute the received service.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments for carrying out the present disclosure will be described in detail and with reference to the drawings. Note that the exemplary embodiments describe the case of applying the present disclosure to an image forming system that executes a service using multiple image forming devices. In addition, the exemplary embodiments describe a case of applying an information processing device according to an exemplary embodiment of the present disclosure to a server.

First Exemplary Embodiment

Figure 1:
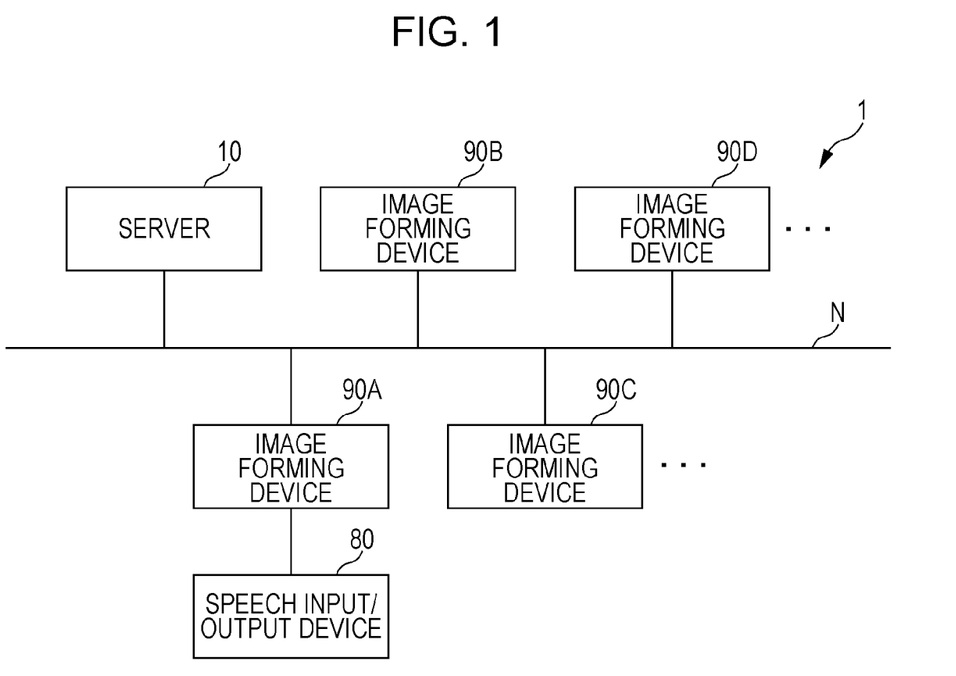
FIG. 1 is a block diagram illustrating an example of the configuration of an image forming system according to an exemplary embodiment.

First, FIG. 1 will be referenced to describe a configuration of an image forming system 1 according to the exemplary embodiment.

As illustrated in FIG. 1, the image forming system 1 according to the exemplary embodiment includes a server 10 that plays a central role in the system, and multiple image forming devices 90A, 90B, and so on. Note that in the following, the image forming devices 90A, 90B, and so on will be collectively referred to as the "image forming device(s) 90" when not being individually distinguished.

The server 10 and the multiple image forming devices 90 are connected through a network N, and the server 10 is capable of bidirectional communication with each of the image forming devices 90 through the network N. Note that in the exemplary embodiment, an internal corporate communication channel such as a local area network (LAN) or a wide area network (WAN) is applied as the network N, but the network N is not limited thereto. For example, a public communication channel such as the Internet or a telephone line may also be applied as the network N, and a combination of an internal corporate communication channel and a public communication channel may also be applied. Additionally, in the exemplary embodiment, a wired communication channel is applied as the network N, but the configuration is not limited thereto. A wireless communication channel may also be applied, and a combination of wired and wireless communication channels may also be applied.

In the image forming system 1, a speech input/output device 80 is connected to one or some (in the exemplary embodiment, the image forming device 90A) among the multiple image forming devices 90. The speech input/output device 80 according to the exemplary embodiment has a function of inputting an utterance spoken by a user as speech data and a function of outputting speech according to predetermined speech data.

Note that in the image forming system 1 according to the exemplary embodiment, the speech input/output device 80 is controlled indirectly by the server 10 through the image forming device 90A, but the configuration is not limited thereto. For example, the speech input/output device 80 may also be connected to the server 10 without going through the image forming device 90A, and the speech input/output device 80 may be controlled directly from the server 10. Also, in the exemplary embodiment, a smart speaker is applied as the speech input/output device 80, but the speech input/output device 80 is not limited thereto. For example, another device capable of inputting and outputting speech, such as a smartphone or a mobile information terminal device, may also be applied as the speech input/output device 80. Also, in the exemplary embodiment, a digital multi-function device including functions such as an image printing function, an image reading function, and an image transmitting function is applied as the image forming device 90, but obviously the image forming device 90 is not limited thereto.

Furthermore, the exemplary embodiment describes a case in which the speech input/output device 80 is configured separately from the image forming device 90a, but the configuration is not limited thereto, and the speech input/ output device 80 may also be incorporated into the image forming device 90A.

Figure 2:
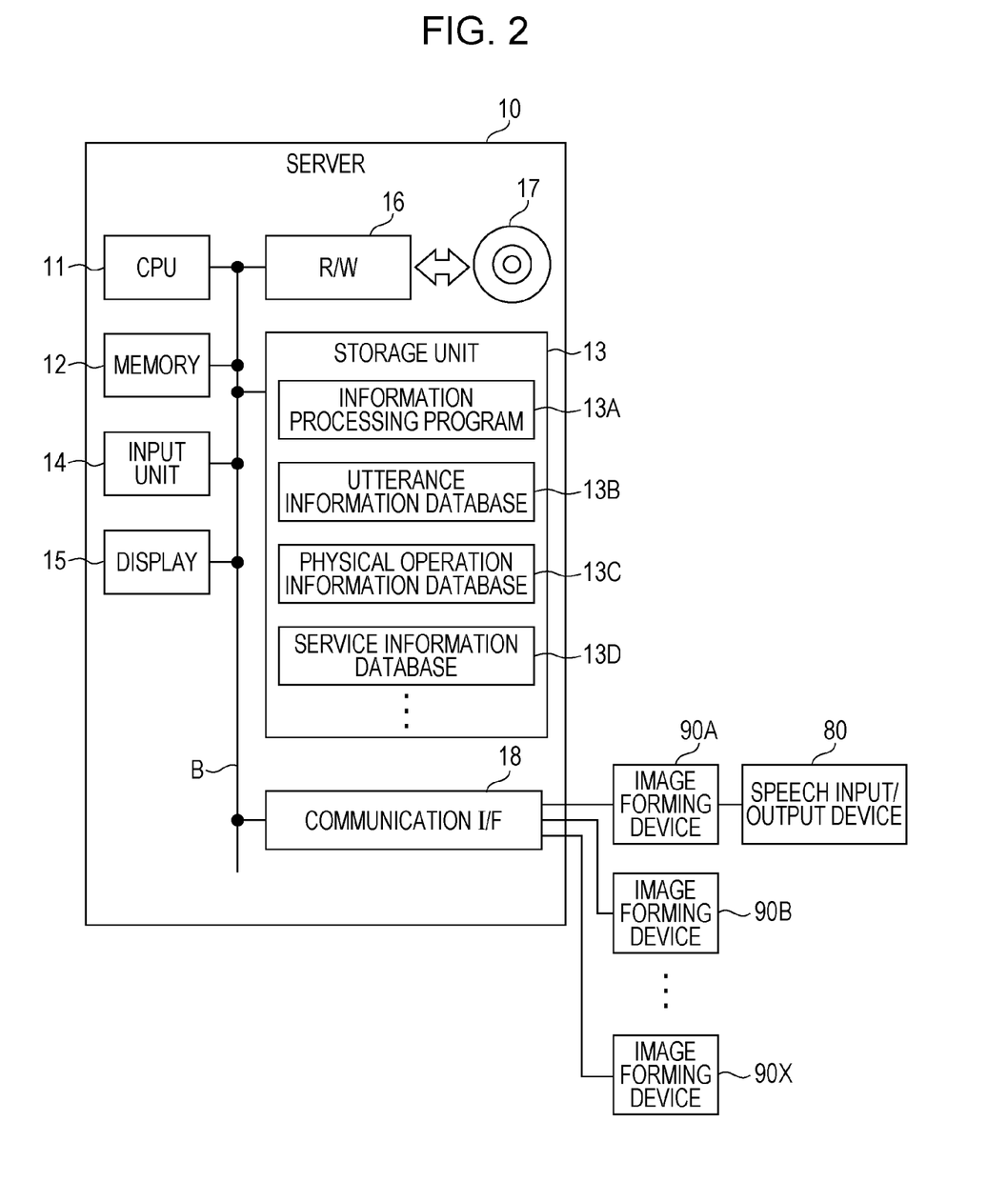
FIG. 2 is a block diagram illustrating an example of a hardware configuration of a server according to an exemplary embodiment.
Figure 3:
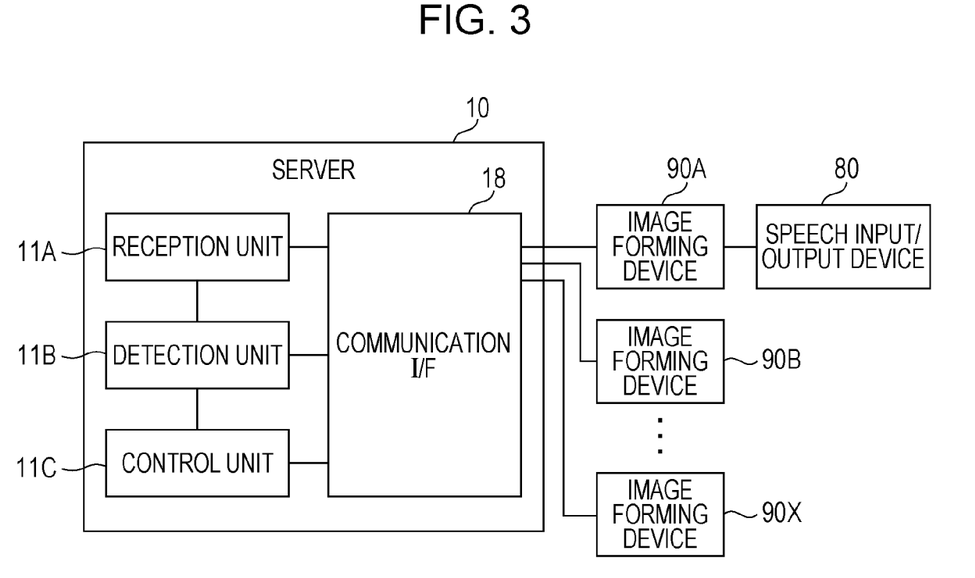
FIG. 3 is a block diagram illustrating an example of a functional configuration of the server according to an exemplary embodiment.

Next, FIGS. 2 and 3 will be referenced to describe the configuration of the server 10 according to the exemplary embodiment. Note that an information processing device such as a personal computer or a server computer is given as an example of the server 10.

As illustrated in FIG. 2, the server 10 according to the exemplary embodiment is provided with a central processing unit (CPU) 11 as a processor, memory 12 as a temporary memory area, a non-volatile storage unit 13, an input unit 14 such as a keyboard and mouse, a display 15 such as a liquid crystal display, a media reading/writing device (R/W) 16, and a communication interface (I/F) 18. The CPU 11, memory 12, storage unit 13, input unit 14, display 15, media reading/writing device 16, and communication I/F 18 are interconnected through a bus B. The media reading/writing device 16 reads out information written to a recording medium 17 and also writes information to the recording medium 17.

The storage unit 13 is achieved with a device such as a hard disk drive (HDD), a solid-state drive (SSD), or flash memory. An information processing program 13A is stored in the storage unit 13, which acts as a storage medium. The information processing program 13A is stored in the storage unit 13 by loading the recording medium 17 with the information processing program 13A written thereto into the media reading/writing device 16 and causing the media reading/writing device 16 to read out the information processing program 13A from the recording medium 17. The CPU 11 reads out and loads the information processing program 13A from the storage unit 13 into the memory 12, and sequentially executes processes included in the information processing program 13A.

In addition, an utterance information database 13B, a physical operation information database 13C, and a service information database 13D are stored in the storage unit 13. The utterance information database 13B, the physical operation information database 13C, and the service information database 13D will be described in detail later.

Next, FIG. 3 will be referenced to describe a functional configuration of the server 10 according to the exemplary embodiment. As illustrated in FIG. 3, the server 10 includes a reception unit 11A, a detection unit 11B, and a control unit 11C. The CPU 11 of the server 10 functions as the reception unit 11A, the detection unit 11B, and the control unit 11C by executing the information processing program 13A.

The reception unit 11A according to the exemplary embodiment receives an instruction for executing a service using the image forming device 90, the instruction being received as an utterance through the speech input/output device 80. Note that in the exemplary embodiment, the instruction to execute a service is acquired by the reception unit 11A from the image forming device 90A through the communication I/F 18, but as described above, the configuration is not limited thereto. Also, in the exemplary embodiment, an image reading service is applied as the service, but the configuration is not limited thereto, and another service such as an image printing service or an image transmission service for example may also be applied. Also, in the exemplary embodiment, the service may include processes performed for a fee in addition to processes performed free of charge.

Also, the detection unit 11B according to the exemplary embodiment detects a physical operation for causing the image forming device 90 to execute a service. Note that in the exemplary embodiment, an operation of placing a document in an auto document feeder (ADF) of the image forming device 90 is applied as the physical operation, but the physical operation is not limited thereto. For example, another operation such as an operation of connecting the image forming device 90 to a facsimile (fax) line or an operation of inserting Universal Serial Bus (USB) memory into the image forming device 90 may also be applied as the physical operation. In other words, operations of mounting external media onto the device are included as the physical operation. Additionally, an operation of accepting electronic data from an external source, such as the device receiving electronic data over a fax line or receiving electronic document data from an external device such as a personal computer, is included as the physical operation. Also, these operations may be applied individually or in combinations of multiple operations. Furthermore, in the exemplary embodiment, the detection unit 11B is configured to detect the physical operation using a sensor installed in the ADF, but the configuration is not limited thereto. For example, a configuration such as one in which the detection unit 11B detects the physical operation with a Vbus detection circuit inside the image forming device 90 may be applied, and these may be applied individually or in combination with each other.

Also, the control unit 11C according to the exemplary embodiment causes service to be executed by the image forming device 90 where the operation is detected closest to the time of receiving the instruction. Note that in the exemplary embodiment, the control unit 11C causes the service to be executed by the image forming device 90 where the operation is detected immediately after the time of receiving the instruction.

In addition, in the case where the operation is not detected by the detection unit 11B within a predetermined length of time from the time at which the reception unit 11A received the instruction, the control unit 11C causes information prompting the user to perform the operation to be presented. Specifically, in the control unit 11C according to the exemplary embodiment, a presentation using speech produced by the speech output function of the speech input/output device 80 is applied as the presentation. Also, in the control unit 11C according to the exemplary embodiment, a displayed presentation using the display of the image forming device 90A is also applied as the presentation.

Also, the control unit 11C according to the exemplary embodiment causes the service to be executed by the image forming device 90 where the operation is detected immediately after causing information prompting the user to perform the operation to be presented, but the configuration is not limited thereto. For example, in the case where the operation is not detected within the predetermined length of time from the time of receiving the instruction, the control unit 11C may cause the service to be executed by an image forming device 90 preregistered by a person such as a user of the server 10.

Also, in the case where the operation is detected in multiple image forming devices 90 within the predetermined length of time immediately after the time of receiving the instruction, the reception unit 11A according to the exemplary embodiment additionally receives an indication of which image forming device 90 is to execute the service, and the control unit 11C causes the indicated image forming device 90 to executed the service.

Also, the control unit 11C according to the exemplary embodiment additionally causes the image forming device 90 made to execute the service to present specifying information by which the image forming device 90 is specifiable. Note that in the exemplary embodiment, the control unit 11C causes the specifying information to be presented in the case where the volume of noise produced together with the utterance giving the instruction to execute the service received by the reception unit 11A is higher than a predetermined level and also in the case where the operation is detected in multiple image forming devices 90 within a predetermined length of time closest to the time at which the reception unit 11A receives the instruction, but the configuration is not limited thereto. For example, the control unit 11C may also cause the specifying information to be presented every time the service is executed.

Note that in the exemplary embodiment, in the case where the volume of the noise is equal to or higher than the level set as the predetermined level, it is determined that the utterance spoken together with the noise is difficult to recognize, and a level obtained by prior experiment using real equipment, computer simulation, or the like is applied, but the configuration is not limited thereto. For example, the predetermined level may be preset by a person such as a user of the server 10, or according to properties such as the recognition accuracy of the utterance computed for information processing described later or the purpose of the server 10.

Also, the reception unit 11A according to the exemplary embodiment additionally receives an utterance in response to the presentation of the specifying information, and the control unit 11C according to the exemplary embodiment controls the image forming device 90 according to the utterance received by the reception unit 11A.

Figure 4:
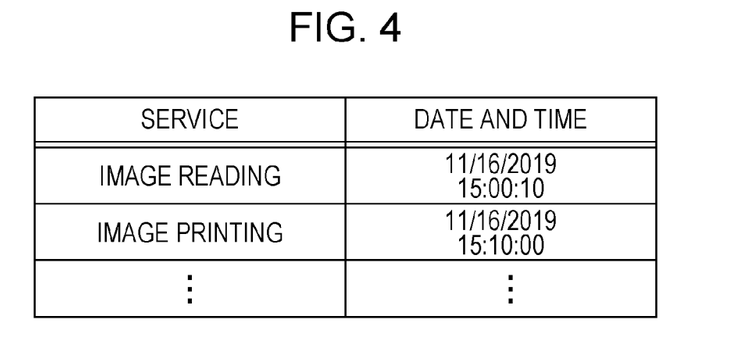
FIG. 4 is a schematic diagram illustrating an example of a configuration of an utterance information database according to an exemplary embodiment.

Next, the utterance information database 13B according to the exemplary embodiment will be described. As illustrated in FIG. 4, in the utterance information database 13B according to the exemplary embodiment, information about a service and date and time information is stored in association with each other.

The service is information indicating a service received by the reception unit 11A, while the date and time is information indicating the date and time of receiving an instruction for executing the corresponding service. For instance, the example illustrated in FIG. 4 expresses that an instruction for executing an image reading service was received at 3:00:10 pm on Nov. 16, 2019.

Figure 5:
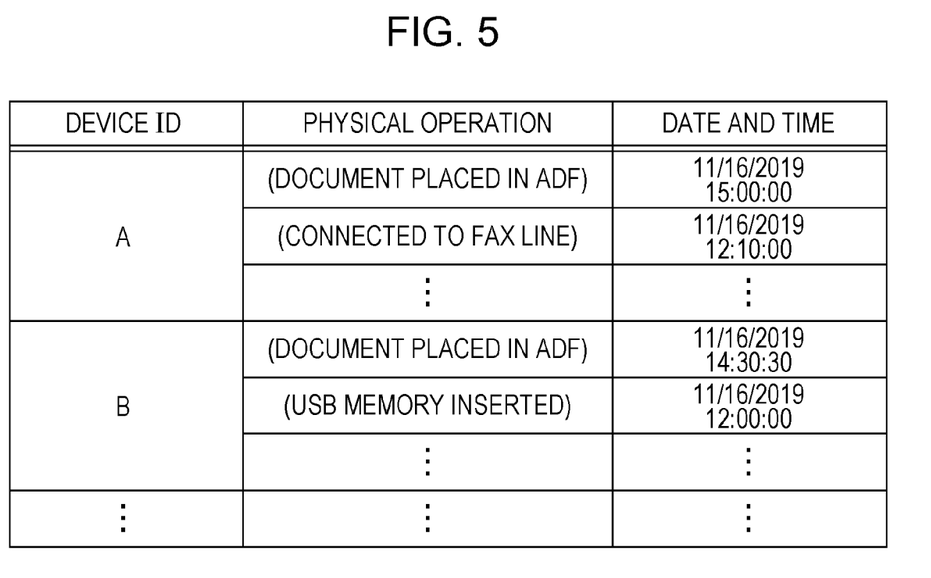
FIG. 5 is a schematic diagram illustrating an example of a configuration of a physical operation information database according to an exemplary embodiment.

Next, the physical operation information database 13C according to the exemplary embodiment will be described. As illustrated in FIG. 5, in the physical operation information database 13C according to the exemplary embodiment, device identification (ID) information, information about a physical operation, and date and time information is stored in association with each other.

The device ID is information indicating an image forming device for which the detection unit 11B has detected a physical operation. The physical operation is information indicating the physical operation detected by the detection unit 11B. The date and time is information indicating the date and time of detecting the corresponding physical operation. For instance, the example illustrated in FIG. 5 expresses that USB memory was inserted into the image forming device 90 assigned "B" as a device ID at precisely 12 pm on Nov. 16, 2019.

Figure 6:
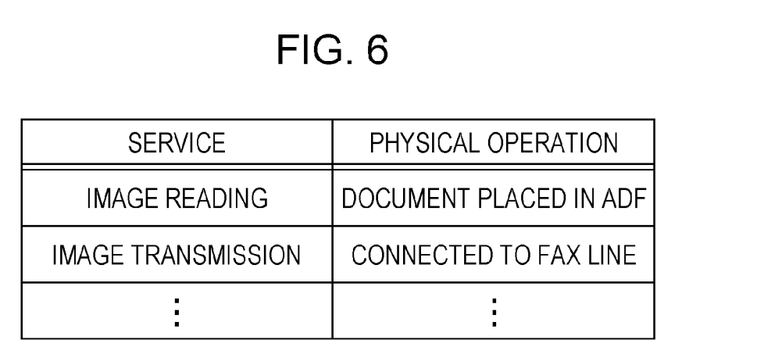
FIG. 6 is a schematic diagram illustrating an example of a configuration of a service information database according to an exemplary embodiment.

Next, the service information database 13D according to the exemplary embodiment will be described. As illustrated in FIG. 6, in the service information database 13D according to the exemplary embodiment, information about a service and information about a physical operation is stored in association with each other.

The service is information indicating a service using the image forming device 90, and the physical operation is information indicating a physical operation for causing the corresponding service to be executed. For instance, the example illustrated in FIG. 6 expresses that the physical operation for causing an image reading service to be executed is an operation of placing a document in the ADF.

Next, FIGS. 7A and 7B and FIGS. 8 to 11 will be referenced to describe the configuration of the server 10 according to the exemplary embodiment. In the case where a user inputs, through the input unit 14, an instruction for starting the execution of the information processing program 13A, the CPU 11 of the server 10 executes the information processing program 13A, thereby causing the information processing illustrated in FIGS. 7A and 7B to be executed.

Figure 7A:
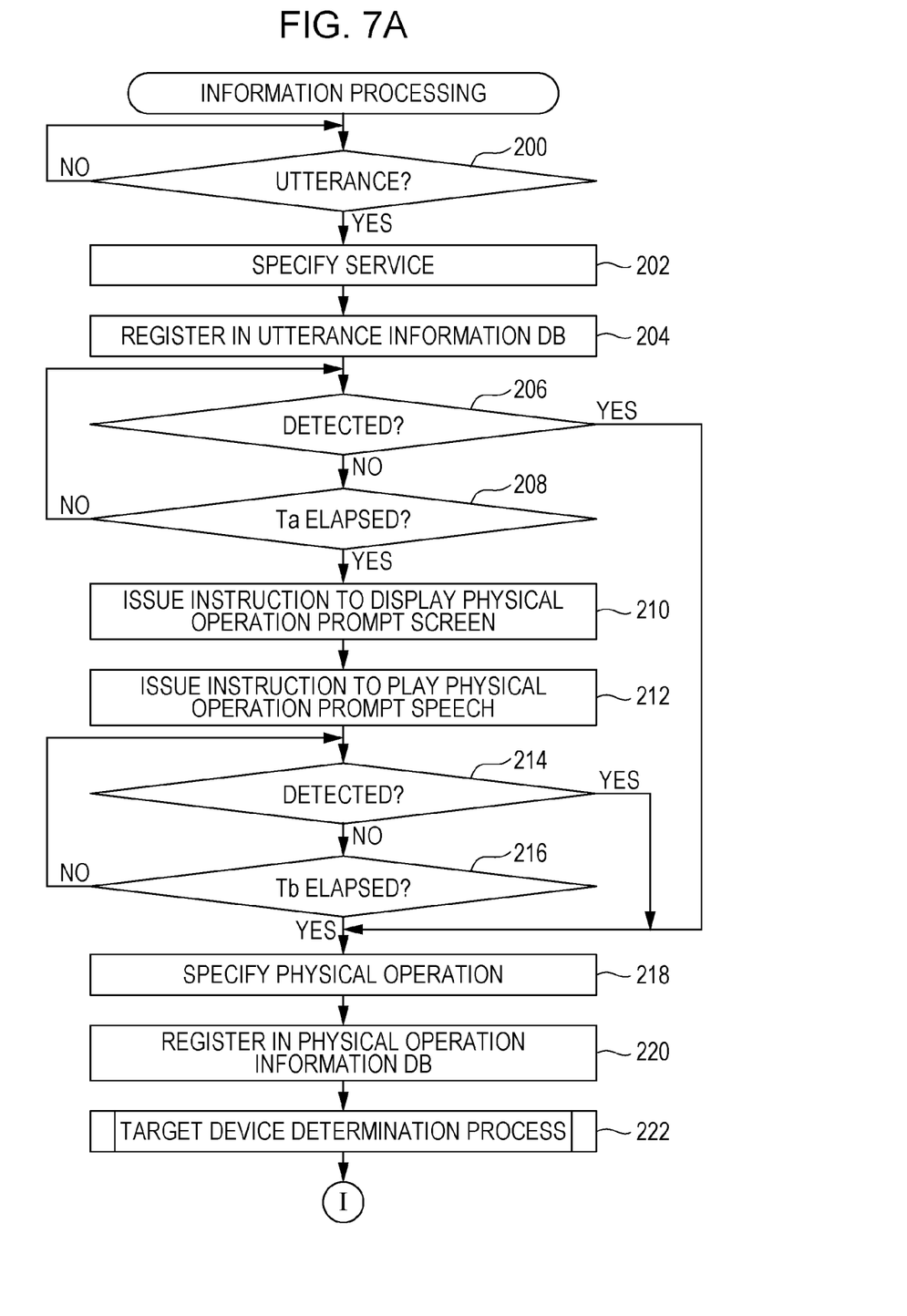
FIGS. 7A and 7B are flowcharts illustrating an example of a flow of information processing according to a first exemplary embodiment.

In step 200, the CPU 11 stands by until the user speaks an utterance expressing an instruction to execute a service to the speech input/output device 80, and speech data corresponding to the utterance is input from the speech input/output device 80 through the image forming device 90A. In step 202, the CPU 11 performs an existing speech recognition process of the related art on the input speech data, and thereby specifies the service to be executed according to the instruction by the user. In the following, the service specified in this way is referred to as the "specified service". In step 204, the CPU 11 registers the specified service and the date and time of receiving the instruction for executing the specified service (hereinafter referred to as the "received date and time") in the utterance information database 13B.

In step 206, the CPU 11 reads out the physical operation for executing the specified service from the service information database 13D, and determines whether or not the read-out operation has been detected. In the case of a positive determination, the flow proceeds to step 218 described later, whereas in the case of a negative determination, the flow proceeds to step 208. In step 208, the CPU 11 determines whether or not a predetermined time Ta has elapsed since the received date and time, and in the case of a negative determination, the flow returns to step 206, whereas in the case of a positive determination, the flow proceeds to step 210. Note that in the exemplary embodiment, a length of time preset by a person such as a user of the server 10 is applied as the predetermined time Ta, but a length of time determined automatically according to properties such as the frequency at which the image forming device 90 is used may also be set as the predetermined time Ta.

In step 210, to cause the specified service to be executed, the CPU 11 causes the display of the image forming device 90A to display a physical operation prompt screen prompting the user to perform some kind of physical operation on the image forming device 90.

Figure 8:
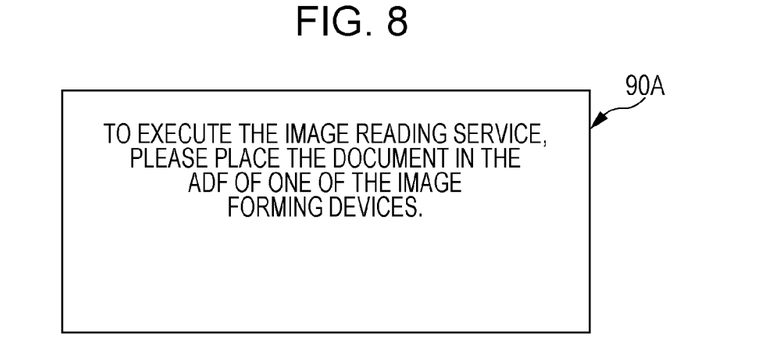
FIG. 8 is a front view illustrating an example of a physical operation prompt screen according to an exemplary embodiment.

As illustrated in FIG. 8, on the physical operation prompt screen according to the exemplary embodiment, information prompting the user to perform some kind of physical operation for executing the specified service on the image forming device 90 is displayed. Consequently, the user who spoke the utterance to execute the specified service is able to refer to the physical operation prompt screen and thereby understand what physical operation to perform on the image forming device 90 to cause the specified service to be executed. For example, in the case where the service that the user indicates to be executed is an image reading service, information prompting the user to place a document into the ADF of one of the image forming devices 90 is displayed on the physical operation prompt screen.

In step 212, the CPU 11 causes the speech input/output device 80 to play (output) speech data that reproduces speech containing content similar to the content displayed on the physical operation prompt screen (hereinafter referred to as "physical operation prompt speech"). Consequently, the user is also able to understand what physical operation to perform on the image forming device 90 to cause the specified service to be executed by listening to the speech played by the speech input/output device 80.

In step 214, the CPU 11 determines whether or not the physical operation for executing the specified service has been detected. In the case of a positive determination, the flow proceeds to step 218 described later, whereas in the case of a negative determination, the flow proceeds to step 216. In step 216, the CPU 11 determines whether or not a predetermined time Tb has elapsed since executing the process in step 212, and in the case of a negative determination, the flow returns to step 214, whereas in the case of a positive determination, the flow proceeds to step 218. Note that in the exemplary embodiment, a length of time preset by a person such as a user of the server 10 is applied as the predetermined time Tb, but a length of time determined automatically according to properties such as the frequency at which the image forming device 90 is used may also be set as the predetermined time Tb.

Figure 7B:
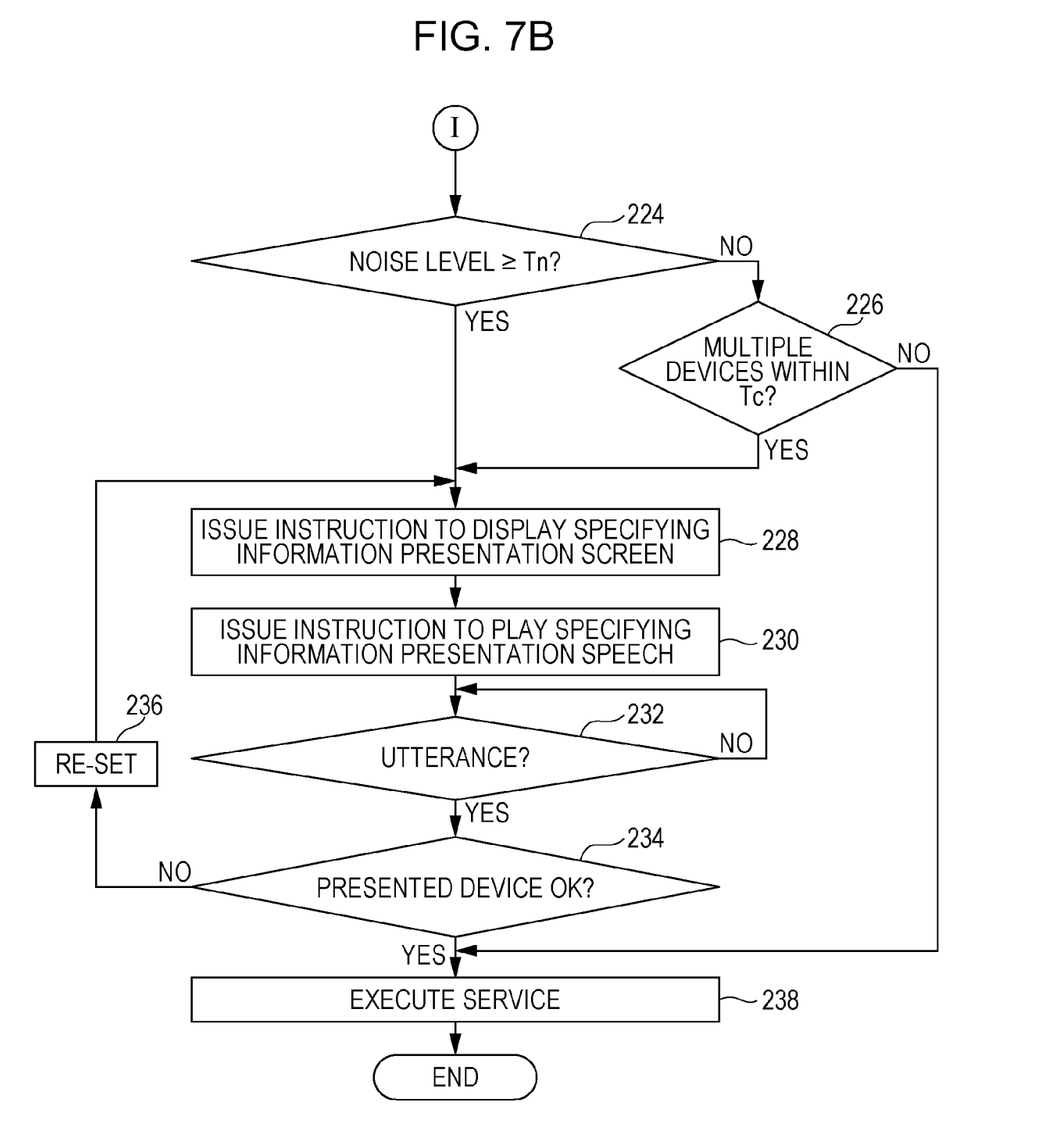

In step 218, the CPU 11 specifies the physical operation detected by the process of step 206 or step 214. In the following, the physical operation specified in this way is referred to as the "specified operation". In step 220, the CPU 11 registers the specified operation and the date and time of detecting the specified operation in the physical operation information database 13C.

In step 222, the CPU 11 executes a target device determination process, which is a process of determining the image forming device (hereinafter referred to as the "target device") to be controlled to execute the specified service specified by the process of step 202. Hereinafter, FIG. 9 will be referenced to describe the target device determination process according to the exemplary embodiment.

Figure 9:
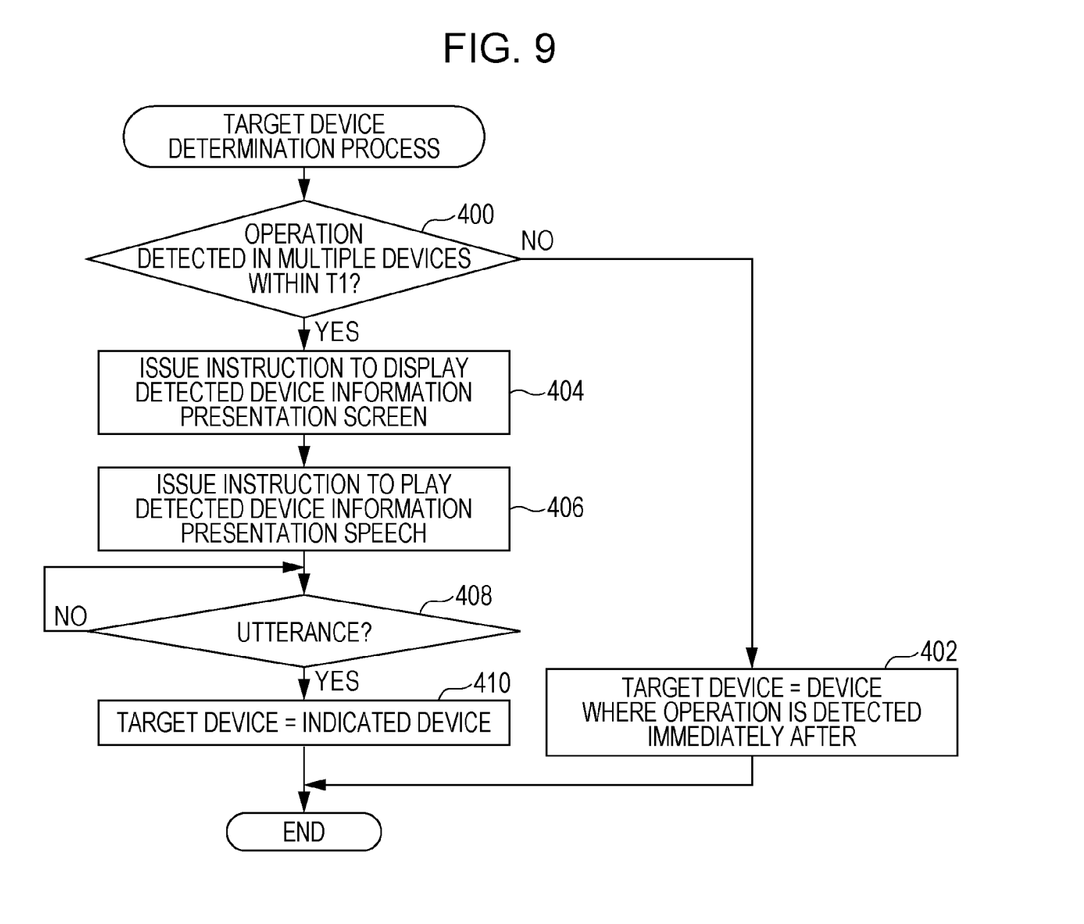
FIG. 9 is a flowchart illustrating an example of a flow of a target device determination process according to the first exemplary embodiment.

In step 400, the CPU 11 reads out all information from the utterance information database 13B and the physical operation information database 13C, and uses the information to determine whether or not the specified operation has been detected in multiple image forming devices 90 within a predetermined time T1 from immediately after the received date and time corresponding to the specified service. In the case where this determination results in a negative determination, the flow proceeds to step 402, the CPU 11 treats the image forming device 90 where the closest specified operation is detected immediately after the received date and time as the target device, and ends the target device determination process.

On the other hand, in the case of a positive determination in step 400, the flow proceeds to step 404, and the CPU 11 causes the display of the image forming device 90A to display a detected device presentation screen that presents the multiple image forming devices 90 determined to exist in the process of step 400. Note that in the exemplary embodiment, a length of time preset by a person such as a user of the server 10 is applied as the predetermined time T1, but a length of time determined automatically according to properties such as the frequency at which the image forming device 90 is used may also be set as the predetermined time T1.

Figure 10:
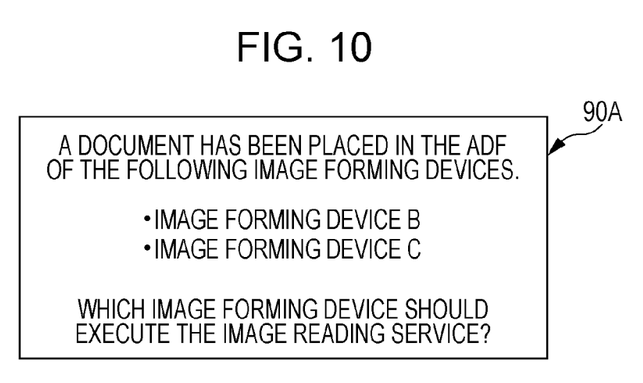
FIG. 10 is a front view illustrating an example of a detected device presentation screen according to an exemplary embodiment.

As illustrated in FIG. 10, on the detected device presentation screen according to the exemplary embodiment, information indicating the multiple image forming devices 90 determined to exist in the process of step 400 and information prompting the user to select a target device from among the multiple image forming devices 90 is displayed. Consequently, by referring to the detected device presentation screen, the user who spoke the utterance to execute the specified service is able to understand the image forming devices 90 where the specified operation is detected.

In step 406, the CPU 11 causes the speech input/output device 80 to play (output) speech data that reproduces speech containing content similar to the content displayed on the detected device presentation screen (hereinafter referred to as "detected device presentation speech"). Consequently, the user is also able to understand the image forming devices 90 where the specified operation is detected by listening to the speech played by the speech input/output device 80, and therefore the user speaks an utterance indicating the image forming device 90 to execute the indicated service. Accordingly, in step 408, the CPU 11 stands by until an utterance corresponding to the image forming device 90 presented by the processes in step 404 and step 406 is spoken with respect to the speech input/output device 80.

In step 410, the CPU 11 uses existing speech recognition technology of the related art to specify the content of the utterance received by the process of step 408, treats the target device as the specified image forming device 90, and ends the target device determination process. When the target device determination process ends, the flow proceeds to step 222 of the information processing (see FIGS. 7A and 7B).

In this way, in the exemplary embodiment, in the case where the specified operation has been detected in multiple image forming devices 90 within a predetermined length of time from the received date and time exist, the CPU 11 additionally receives an indication of which image forming device 90 is to execute the service, and treats the indicated image forming device 90 as the target device. However, the configuration is not limited thereto. For example, the image forming device 90 where the closest specified operation is detected immediately after the received date and time may also be treated as the target device by the CPU 11. As an configuration example for this case, in the target device determination process illustrated in FIG. 9, the CPU 11 may execute only the process of step 402, without executing the processes from step 400 to step 410.

In step 224, the CPU 11 specifies the volume of noise occurring together with the utterance of the instruction for executing the specified service spoken by the user from the speech data input when executing the process of step 200, and determines whether or not the volume of the noise is equal to or greater than a predetermined threshold value Tn. In the case of a positive determination, the flow proceeds to step 228 described later, whereas in the case of a negative determination, the flow proceeds to step 226.

In step 226, the CPU 11 determines whether or not the specified operation has been detected in multiple image forming devices 90 within a predetermined time Tc close to the received date and time, and in the case of a negative determination, the flow proceeds to step 238 described later, whereas in the case of a positive determination, the flow proceeds to step 228. Note that in the exemplary embodiment, a length of time preset by a person such as a user of the server 10 is applied as the predetermined time Tc, but a length of time determined automatically according to properties such as the frequency at which the image forming device 90 is used may also be set as the predetermined time Tc.

In step 228, the CPU 11 causes the display of the image forming device 90A to display a specifying information presentation screen that displays specifying information by which the target device is specifiable. Note that each image forming device 90 may also be provided with a light emitter visible from nearby in advance, and the CPU 11 may cause the light emitter of the target device to emit light and thereby inform the user of the target device.

Figure 11:
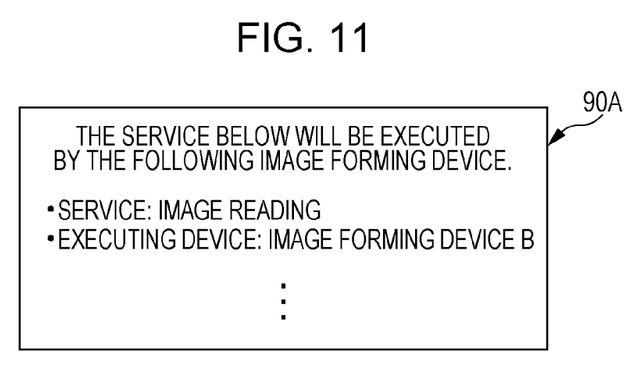
FIG. 11 is a front view illustrating an example of a specifying information presentation screen according to an exemplary embodiment.

As illustrated in FIG. 11, on the specifying information presentation screen according to the exemplary embodiment, the specified service and the specifying information are displayed. Consequently, by referring to the specifying information presentation screen, the user who spoke the utterance to execute the service is able to know the target device.

In step 230, the CPU 11 causes the speech input/output device 80 to play (output) speech data that reproduces speech containing content similar to the content displayed on the specifying information presentation screen (hereinafter referred to as "specifying information presentation speech"). Consequently, the user is also able to know the target device by listening to the speech played by the speech input/output device 80, and therefore the user speaks an utterance indicating whether or not to cause the target device to execute the service. Note that in the case of not causing the target device to execute the service, the user newly utters the device ID of the image forming device 90 that is to execute the service. Accordingly, in step 232, the CPU 11 stands by until an utterance corresponding to the service and the target device presented by the processes in step 228 and step 230 is spoken with respect to the speech input/output device 80.

In step 234, the CPU 11 uses existing speech recognition technology of the related art to specify the content of the utterance received by the process of step 232, and determines whether or not to cause the target device presented by the processes of step 228 and step 230 to execute the specified service. In the case of a negative determination, the flow proceeds to step 236, and the CPU 11 treats the image forming device 90 newly uttered by the user and specified by executing the process of step 232 as the target device. Note that in the case where the CPU 11 repeats the processes from step 228 to step 234, in the process of step 228 and the process of step 230, the CPU 11 causes the image forming device 90 set as the target device by the process of step 236 to be presented as specifying information.

For example, in the case where the CPU 11 causes the image forming device 90 assigned "B" as the device ID to be presented as the specifying information in the first iteration of step 228 and step 230, but the CPU 11 receives an utterance for causing the image forming device 90 assigned "C" as the device ID to execute the specified service in the first iteration of step 232, in the first iteration of step 236, the CPU 11 determines that the image forming device 90 assigned "C" as the device ID is the target device, and returns to step 228. In the second iteration of step 228 and step 230, the CPU 11 causes the image forming device 90 assigned "C" as the device ID to be presented as the specifying information.

On the other hand, in the case of a positive determination in step 234, the flow proceeds to step 238, the CPU 11 causes the image forming device 90 presented as the specifying information by the processes of step 228 and step 230 to execute the specified service, and the information processing ends.

Second Exemplary Embodiment

The first exemplary embodiment above describes a configuration causing the received service to be executed by the image forming device 90 where the physical operation for executing the service is detected immediately after the time of receiving the instruction for executing the service. In contrast, the second exemplary embodiment describes a configuration example for the case where the received service is executed by the image forming device 90 where the operation is detected immediately before the time of receiving the instruction for executing the service. Note that because the configuration of the image forming system 1 and the server 10 according to the second exemplary embodiment is the same as the configuration according to the first exemplary embodiment (see FIGS. 1, 2, and 3), a description is omitted here.

Figure 12A:
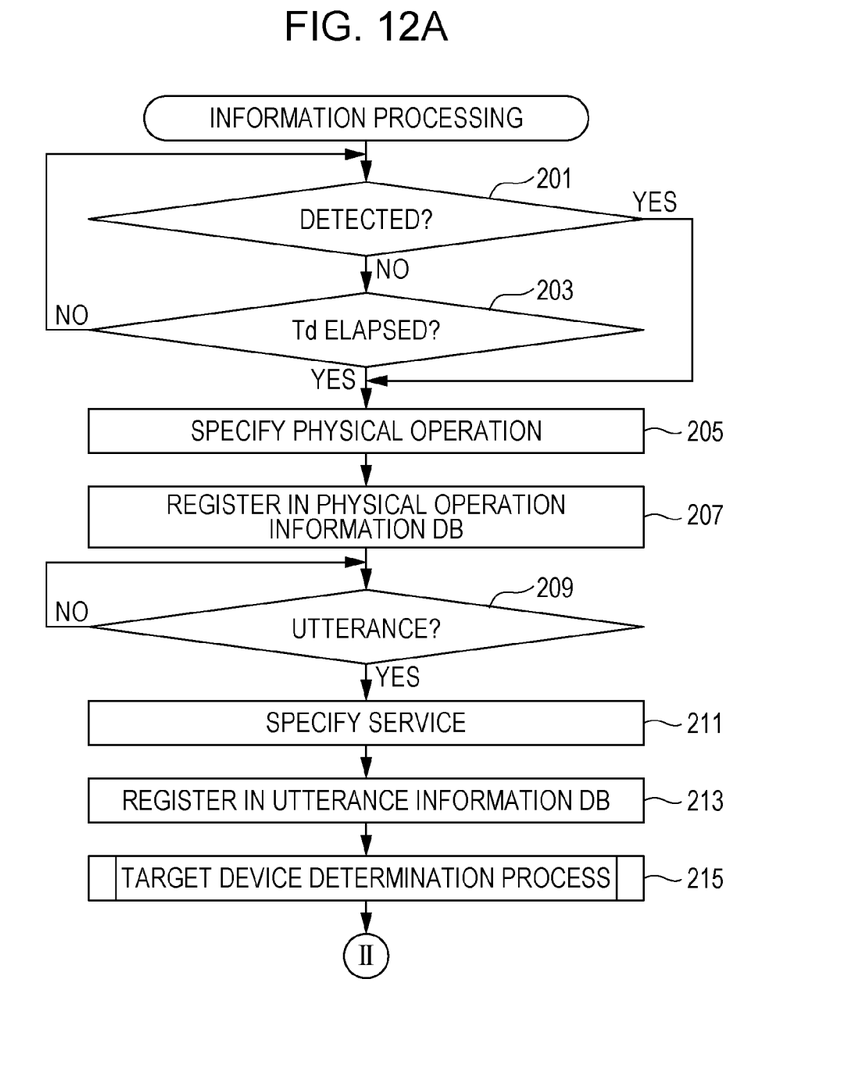
FIGS. 12A and 12B are flowcharts illustrating an example of a flow of information processing according to a second exemplary embodiment.
Figure 12B:
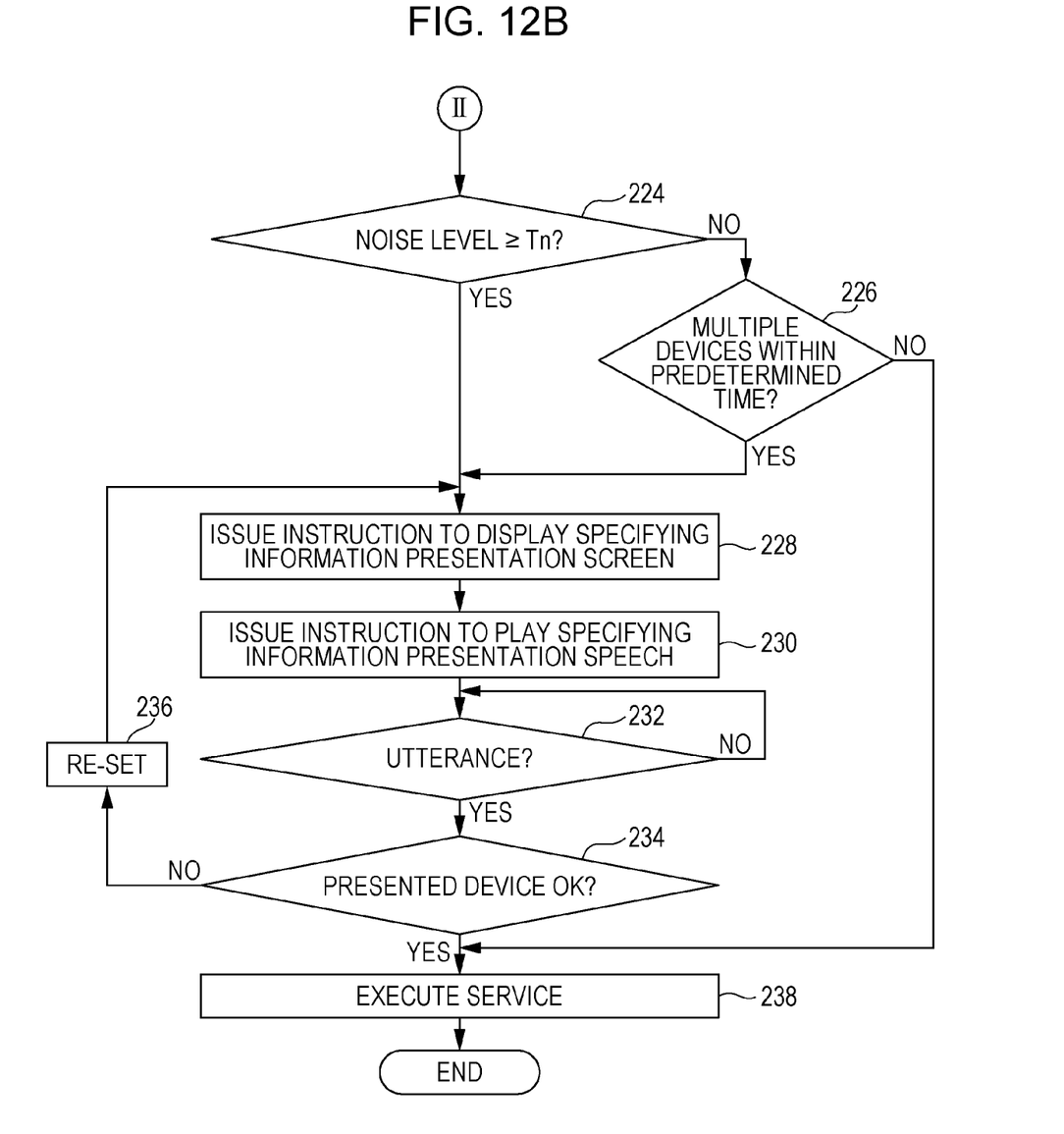

First, FIGS. 12A and 12B will be referenced to describe the actions of the server 10 when executing the information processing as the actions of the server 10 according to the second exemplary embodiment. Note that steps that execute processes in the information processing illustrated in FIGS. 12A and 12B which are the same as the information processing illustrated in FIGS. 7A and 7B are denoted with the same step numbers of FIGS. 7A and 7B, and a description is omitted here.

The information processing illustrated in FIGS. 12A and 12B differs from the information processing illustrated in FIGS. 7A and 7B in that the processes from step 201 to step 215 are applied instead of the processes from step 200 to step 222.

In other words, in step 201 of FIG. 12A, the CPU 11 determines whether the physical operation for causing one of the image forming devices 90 to execute a service has been detected. In the case of a positive determination, the flow proceeds to step 205 described later, whereas in the case of a negative determination, the flow proceeds to step 203. Note that in step 201, the CPU 11 treats all physical operations stored in the service information database 13D as targets of detection.

In step 203, the CPU 11 determines whether or not a predetermined time Td has elapsed since executing the information processing program 13A, and in the case of a negative determination, the flow returns to step 201, whereas in the case of a positive determination, the flow proceeds to step 205. Note that in the exemplary embodiment, a length of time preset by a person such as a user of the server 10 is applied as the predetermined time Td, but a length of time determined automatically according to properties such as the frequency at which the image forming device 90 is used may also be set as the predetermined time Td.

In step 205, the CPU 11 specifies all of the physical operations detected by the process of step 201. In the following, the physical operation specified in this way is referred to as the "specified operation". In step 207, the CPU 11 registers each specified operation and the date and time of detecting each specified operation in the physical operation information database 13C.

In step 209, the CPU 11 reads out each service corresponding to each specified operation from the service information database 13D, and stands by until the user speaks an utterance indicating an instruction to execute one of the services among the read-out services and speech data corresponding to the utterance is input from the speech input/output device 80 through the image forming device 90A. In step 211, the CPU 11 performs an existing speech recognition process of the related art on the input speech data, and thereby specifies the service to be executed according to the instruction by the user. In the following, the service specified in this way is referred to as the "specified service". Note that in the case where the CPU 11 specifies multiple specified operations in step 205, in step 211, the CPU 11 specifies one service as the specified service. In step 213, the CPU 11 registers the specified service and the date and time of receiving the instruction for executing the specified service (hereinafter referred to as the "received date and time") in the utterance information database 13B.

In the next step 215, the CPU 11 executes a target device determination process, which is a process of determining the image forming device (hereinafter referred to as the "target device") to be controlled to execute the specified service specified by the process of step 201. Hereinafter, FIG. 13 will be referenced to describe the target device determination process according to the exemplary embodiment. Note that steps that execute processes in the target device determination process illustrated in FIG. 13 which are the same as the target device determination process illustrated in FIG. 9 are denoted with the same step numbers of FIG. 9, and a description is omitted here.

Figure 13:
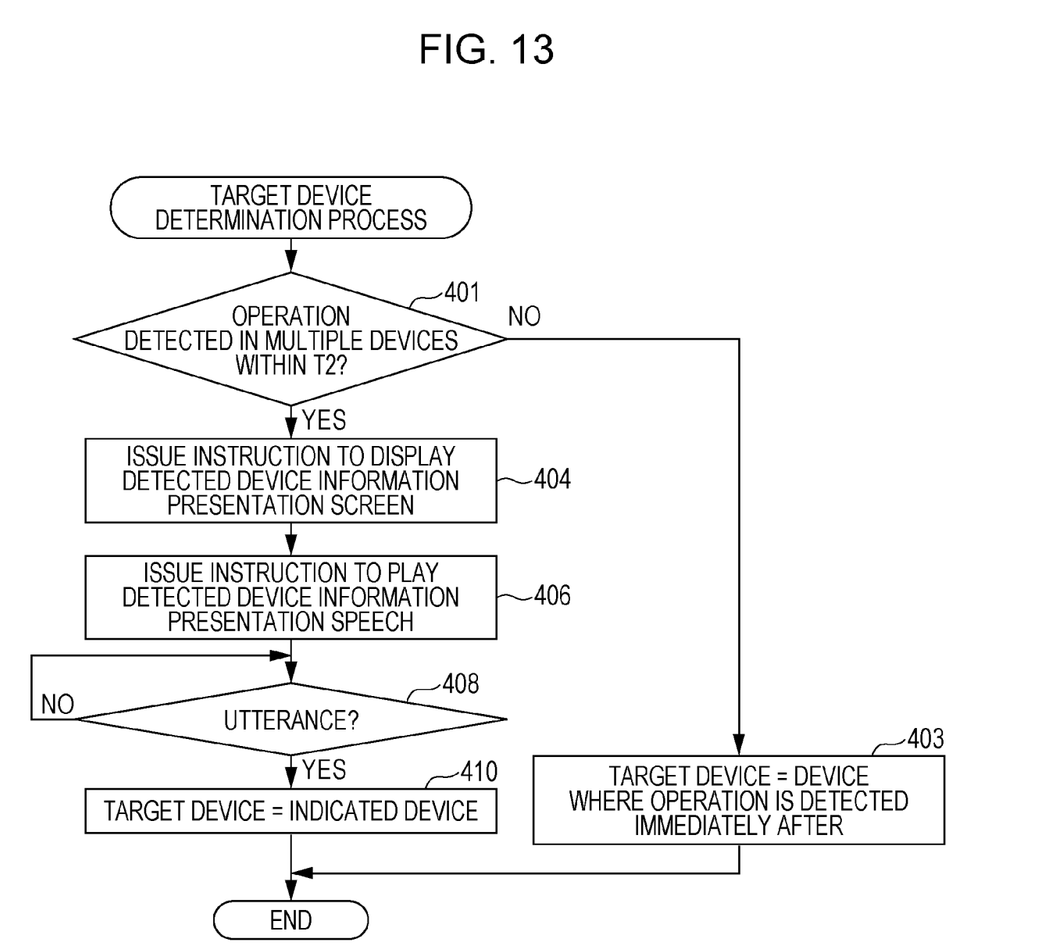
FIG. 13 is a flowchart illustrating an example of a flow of a target device determination process according to the second exemplary embodiment.

The information processing illustrated in FIG. 13 differs from the information processing illustrated in FIG. 9 in that the processes in step 400 and step 402 are applied instead of the processes in step 401 and step 403.

In other words, in step 401 of FIG. 13, the CPU 11 reads out all information from the utterance information database 13B and the physical operation information database 13C, and uses the information to determine whether or not the specified operation is detected in multiple image forming devices 90 within a predetermined time T2 from immediately before the received date and time corresponding to the specified service exist. In the case where this determination results in a negative determination, the flow proceeds to step 403, the CPU 11 treats the image forming device 90 where the closest specified operation is detected immediately before the received date and time as the target device, and ends the target device determination process. Note that in the exemplary embodiment, a length of time preset by a person such as a user of the server 10 is applied as the predetermined time T2, but a length of time determined automatically according to properties such as the frequency at which the image forming device 90 is used may also be set as the predetermined time T2.

Note that the first exemplary embodiment above describes a configuration causing the received service to be executed by the image forming device 90 where the physical operation for executing the service is detected immediately after the time of receiving the instruction for executing the service. Also, the second exemplary embodiment describes a configuration for the case of causing the received service to be executed by the image forming device 90 where the operation is detected immediately before the time of receiving the instruction. However, the configuration is not limited thereto. These configurations may also be combined and applied to a configuration that causes the received service to be executed by the image forming device 90 where the operation is detected at the time closest to the time of receiving the instruction, irrespectively of whether the time is immediately before or after the time of receiving the instruction.

The foregoing describes exemplary embodiments, but the technical scope of the present disclosure is not limited to the scope described in the foregoing exemplary embodiments. Various modifications or alterations may be made to the foregoing exemplary embodiments within a scope that does not depart from the gist of the present disclosure, and any embodiments obtained by such modifications or alterations are also included in the technical scope of the present disclosure.

Furthermore, the foregoing exemplary embodiments do not limit the present disclosure as stated in the claims, and not all combinations of features described in the exemplary embodiments are necessarily required as means for addressing the issues of the present disclosure. The exemplary embodiments described above include various levels of disclosure, and the various disclosures are elicited through the combination of the multiple structural elements disclosed herein. Even if several structural elements are removed from among all of the structural elements illustrated in the exemplary embodiments, the configuration with the several structural elements removed therefrom may still be elicited as an disclosure insofar as an effect is obtained.

In the exemplary embodiments, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Also, the exemplary embodiments apply an image forming device as an example of a device that is made to execute a service, but the applied device is not limited thereto, and may also be a device such as a stove, a washing machine, or a microwave oven, and configurations in which these devices are applied individually or in combinations of multiple devices are also possible.

Additionally, the exemplary embodiments describe a case where the information processing program 13A is preinstalled in the storage unit 13, but the configuration is not limited thereto. For example, an information processing program may also be provided stored on a storage medium such as Compact Disc—Read-Only Memory (CD-ROM), or may be provided over a network.

Furthermore, the foregoing exemplary embodiments describe a case in which the information processing is achieved by a software configuration using a computer by executing a program, but the present disclosure is not limited thereto. For example, the information processing may also be achieved by a hardware configuration, or by a combination of a hardware configuration and a software configuration.

Otherwise, the configurations of the server 10 (see FIGS. 1 to 6) described in the foregoing exemplary embodiments are examples, and obviously, unnecessary portions may be removed or new portions may be added within a scope that does not depart from the gist of the present disclosure.

Also, the flows of the information processing (see FIGS. 7A and 7B and FIGS. 12A and 12B) and the flows of the setting determination process (see FIGS. 9 and 13) described in the exemplary embodiments are also examples, and obviously, unnecessary steps may be removed, new steps may be added, or the processing sequence may be rearranged within a scope that does not depart from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
    a processor configured to
        receive, as an utterance, an instruction for executing a service,
        detect whether a physical operation is performed on a plurality of devices, and
        cause a first device among the plurality of devices where the physical operation is detected closest to a time of receiving the instruction to execute the received service.

2. The information processing device according to claim 1, wherein
    the processor is configured to
        cause the first device where the physical operation is detected immediately before the time of receiving the instruction to execute the received service.

3. The information processing device according to claim 1, wherein
    the processor is configured to
        cause the first device where the physical operation is detected immediately after the time of receiving the instruction to execute the received service.

4. The information processing device according to claim 3, wherein
    in a case where the physical operation performed on the first device is not detected within a predetermined length of time from the time of receiving the instruction,
    the processor is configured to
        cause information prompting a user to perform the physical operation to be presented.

5. The information processing device according to claim 4, wherein
    the processor is configured to
        cause the first device where the physical operation is detected immediately after causing the information to be presented to execute the received service.

6. The information processing device according to claim 1, wherein
    in a case where the physical operation is detected in multiple devices within a predetermined length of time close to the time of receiving the instruction,
    the processor is configured to
        additionally receive an indication of which device is to be controlled to execute the service, and
        cause the indicated device to execute the received service.

7. The information processing device according to claim 1, wherein
    the processor is configured to
        additionally cause specifying information by which the first device to be controlled to execute the service is specifiable to be presented.

8. The information processing device according to claim 7, wherein
    the processor is configured to
        additionally receive an utterance in response to the presentation of the specifying information, and
        control the first device according to the received utterance.

9. The information processing device according to claim 7, wherein in a case where a volume of noise occurring together with the utterance giving the instruction for executing the service is higher than a predetermined level, the processor is configured to cause the specifying information to be presented.

10. The information processing device according to claim 8, wherein in a case where a volume of noise occurring together with the utterance giving the instruction for executing the service is higher than a predetermined level, the processor is configured to cause the specifying information to be presented.

11. The information processing device according to claim 7, wherein in a case where the physical operation is detected in multiple devices within a predetermined length of time close to the time of receiving the instruction, the processor is configured to cause the specifying information to be presented.

12. The information processing device according to claim 8, wherein in a case where the physical operation is detected in multiple devices within a predetermined length of time close to the time of receiving the instruction, the processor is configured to cause the specifying information to be presented.

13. The information processing device according to claim 1, wherein the first device is an image forming device.

14. The information processing device according to claim 1, wherein in a case where the processor receives a first utterance instruction for executing a first service and detects a first physical operation performed on a first physical component of the first device related to the first service, the processor causes the first device to execute the first service by using the first physical component, and wherein in a case where the processor receives a second utterance instruction for executing a second service and detects a second physical operation performed on a second physical component of the first device related to the second service, the processor causes the first device to execute the second service by using the second physical component.

15. The information processing device according to claim 1, wherein the processor detects the physical operation by using a sensor to sense a physical contact performed on the first device.

16. The information processing device according to claim 1, wherein the processor detects the physical operation by determining whether the first device is connected to another external device.

17. A non-transitory computer readable medium storing a program causing a computer to execute a process for processing information, the process comprising:

receiving, as an utterance, an instruction for executing a service;

detecting whether a physical operation is performed on a plurality of devices; and causing a first device among the plurality of devices where the physical operation is detected closest to a time of receiving the instruction to execute the received service.

* * * * *